United States Patent
Heins et al.

(10) Patent No.: US 10,239,391 B1
(45) Date of Patent: Mar. 26, 2019

(54) SLIDING APPARATUS FOR SUNROOF OF AN AUTOMOBILE

(71) Applicant: AISIN TECHNICAL CENTER OF AMERICA, INC., Northville, MI (US)

(72) Inventors: Ryan Heins, Ann Arbor, MI (US); Shintaro Katsura, Novi, MI (US)

(73) Assignee: AISIN TECHNICAL CENTER OF AMERICA, INC., Northville, MI (US)

( * ) Notice: Subject to any disclaimer, the term of this patent is extended or adjusted under 35 U.S.C. 154(b) by 0 days.

(21) Appl. No.: 15/716,045

(22) Filed: Sep. 26, 2017

(51) Int. Cl.
*B60J 7/057* (2006.01)
*B60J 7/043* (2006.01)

(52) U.S. Cl.
CPC ............. *B60J 7/057* (2013.01); *B60J 7/0435* (2013.01)

(58) Field of Classification Search
CPC ... B60J 7/02; B60J 7/024; B60J 7/0435; B60J 7/057; B60J 7/0573
USPC ........................................... 296/216.05, 223
See application file for complete search history.

(56) References Cited

U.S. PATENT DOCUMENTS

| | | | | |
|---|---|---|---|---|
| 5,306,070 A | * | 4/1994 | Schlapp | B60J 7/05 296/222 |
| 5,358,303 A | * | 10/1994 | Huyer | B60J 7/05 296/221 |
| 6,416,122 B1 | * | 7/2002 | Schwarz | B60J 7/047 296/220.01 |
| 9,821,643 B1 | * | 11/2017 | Heins | B60J 7/024 |
| 2012/0112498 A1 | | 5/2012 | Kikuchi et al. | |

* cited by examiner

*Primary Examiner* — Dennis H Pedder
(74) *Attorney, Agent, or Firm* — Oblon, McClelland, Maier & Neustadt, L.L.P.

(57) ABSTRACT

A sliding apparatus for a sunroof of an automobile including a shoe having a first channel and a second channel slidably connected to a rail, a guide block including a front channel connecting a lower channel to form a first path, and a rear channel connecting to an upper channel to form a second path, and a lever with a first pin projecting from a first side and a second side, a second pin projecting from the first side and a third pin projecting from the second side. The first pin is connected to the front channel and the second pin is connected to the rear channel on the first side, and the first pin is connected to the first channel and the third pin is connected to the second channel on a second side.

16 Claims, 14 Drawing Sheets

SLIDING APPARATUS FOR SUNROOF OF AN AUTOMOBILE

BACKGROUND

Field of the Disclosure

This disclosure relates generally to improvements to a movable sunroof. More particularly, the present disclosure relates to a sliding apparatus that displaces a sunroof from a closed position to an open position and vice-versa.

Description of the Related Art

A sunroof of an automobile can be fixed or movable. A movable sunroof includes a slidable panel that creates an opening in a roof of the automobile to allow light and fresh air to enter the passenger compartment.

Typically, the movable sunroof includes a sliding panel that can tilt-up and/or slide relative to a roof of the automobile. The sliding panel can move from front of the car towards the back of the automobile. The sliding panel is connected to a sliding mechanism that is designed to move the sliding panel from a closed position to a tilt-up position and a fully open position. Alternatively, the sliding panel can be hinged such that the sliding panel can be opened directly without going occupying an intermediate position such as a tilt-up position.

The sliding mechanism can be operated manually or automatically via an electric motor. The sliding mechanism is installed along the sides of an opening in the roof. The sliding mechanism includes a movable component that can slide along a rail and a guide block or guide link to achieve different positions such as tilting, and sliding in a horizontal manner. Also, the guide block of the sliding mechanisms create gaps between the sliding panel and the roof, thus affecting the aesthetics and aerodynamic characteristics of the automobile.

SUMMARY

According to an embodiment of the present disclosure, there is provided a sliding apparatus for a sunroof of an automobile. The apparatus includes a shoe having a first channel and a second channel slidably connected to a rail, a guide block including a front channel connecting a lower channel to form a first path, and a rear channel connecting to an upper channel to form a second path, and a lever including a first pin projecting from a first side and a second side, a second pin projecting from the first side and a third pin projecting from the second side. The first pin is connected to the front channel of the guide block and the second pin is connected to the rear channel of the guide block on the first side, and the first pin is connected to the first channel of the shoe and the third pin is connected to the second channel of the shoe on the second side, where the first pin travels along the first path in the guide block, and the second pin travels along the second path in the guide block.

The sliding apparatus further includes a check block including a sliding portion having a closed profiled shape on one side and a front pin holder on the other side of the check block, where the sliding portion is slidably connected to the front channel of the guide block and the front pin holder is pivotably connected to the lever via the first pin that passes through the front pin holder; and a roller slidably connected to the rear channel of the guide block and pivotably connected to the lever via the second pin.

The forgoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION

The description set forth below in connection with the appended drawings is intended as a description of various embodiments of the disclosed subject matter and is not necessarily intended to represent the only embodiment(s).

It is to be understood that terms such as "left," "right," "top," "bottom," "front," "rear," "side," "height," "length," "width," "upper," "lower," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "proximate," "minor," and similar terms generally refer to ranges that include the identified value within a margin of 20%, 10% or preferably 5% in certain embodiments, and any values therebetween.

Figures 1A, 1B, 1C:
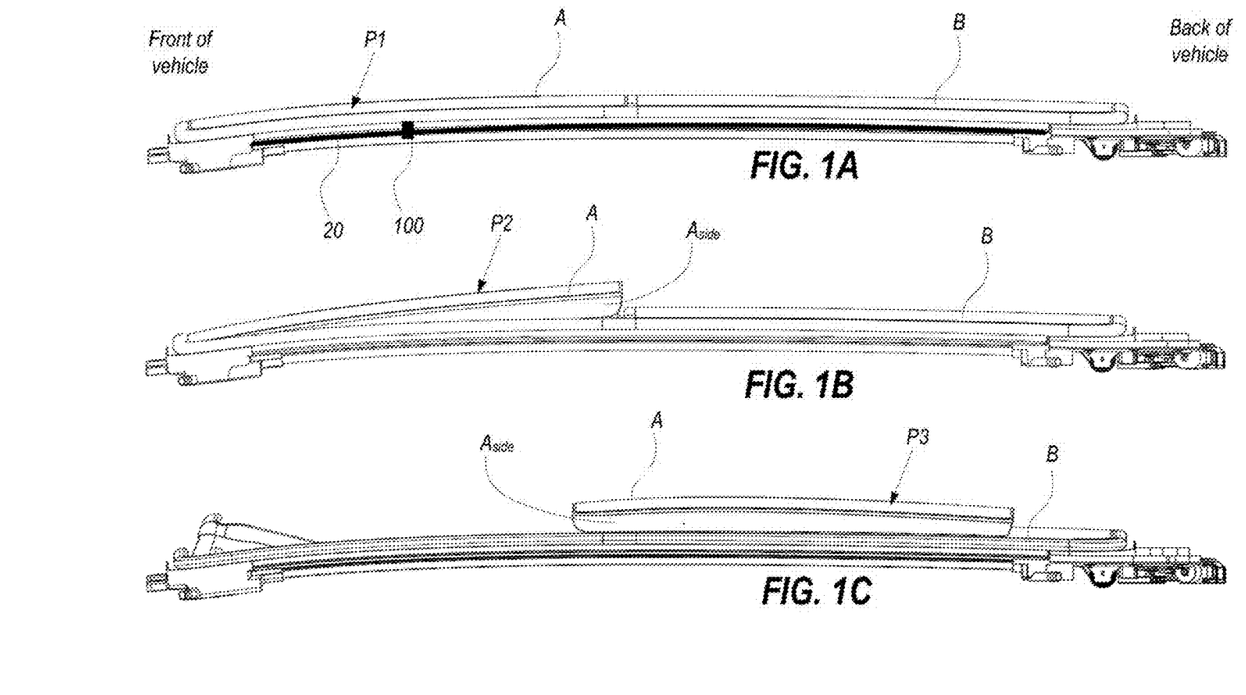
FIG. 1A illustrate a sunroof of an automobile in a first position according to an exemplary embodiment of the present disclosure.
FIG. 1B illustrate a sunroof of an automobile in a second position according to an exemplary embodiment of the present disclosure.
FIG. 1C illustrate a sunroof of an automobile in a third position according to an exemplary embodiment of the present disclosure.

FIGS. 1A-1C illustrates a sunroof of an automobile in a first position P1, a second position P2, and a third position P3, respectively, according to an exemplary embodiment of the present disclosure. The sunroof of an automobile includes a first panel A having a side garnish $A_{side}$ and a second panel B. The first panel A is connected to a sliding mechanism 10 (illustrated in FIG. 3A) that allows the first panel A to tilt and slide over the second panel B. The sliding mechanism 10 enables the first panel A to occupy the first position P1 (also referred as closed position), the second position P2 (also referred as tilt-up potion), and the third position P3 (also referred as open position). The sliding mechanism 10 includes a guide block 100 that defines the tilting and sliding motion of the first panel A.

Typically, the guide block 100 of the sliding mechanism 10 is installed on a rail 20. The conventional guide blocks of the sliding mechanism 10 cause a gap between the first panel A and the second panel B when sliding. The guide block 100 of the present disclosure allows the first panel A, particularly the side garnish $A_{side}$ to remain flushed with the second panel B, thus eliminating the gap.

Figure 2:
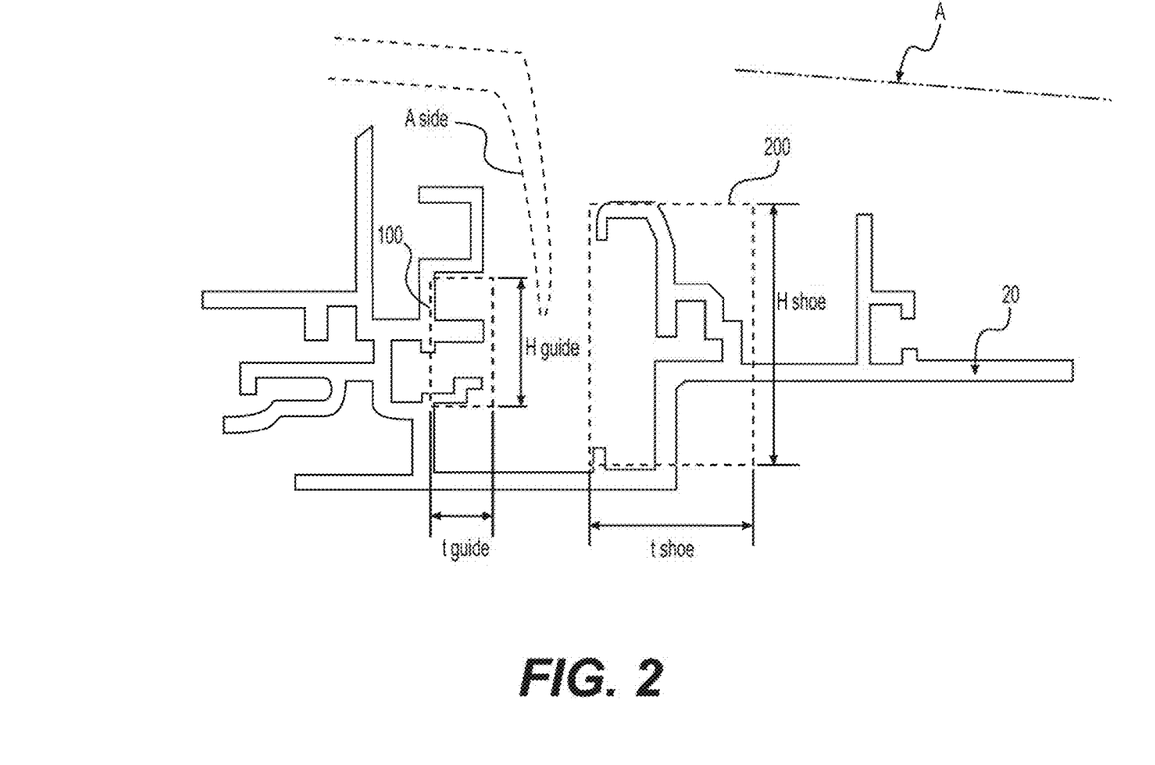
FIG. 2 illustrates a location of a guide block and a shoe of the sliding mechanism on a rail according to an exemplary embodiment of the present disclosure.

FIG. 2 illustrates a location of the guide block 100 and a shoe 200 of the sliding mechanism 10 on a rail 20 according to an exemplary embodiment of the present disclosure. The guide block 100 is located on an inner side (left side) with respect to a shoe 200. The inner side has a smaller dimension compared to the outer side (right side), where the shoe 200 is installed. As such, the dimensions of the guide block 100 are restricted by the structure of the rail 20. The guide block 100 can be of height $H_{guide}$ and thickness $t_{guide}$. The $H_{guide}$ is shorter than a shoe height $H_{shoe}$, the height of the shoe 200. Also, the thickness $t_{guide}$ can be smaller than a shoe thickness $t_{shoe}$.

Figure 3A:
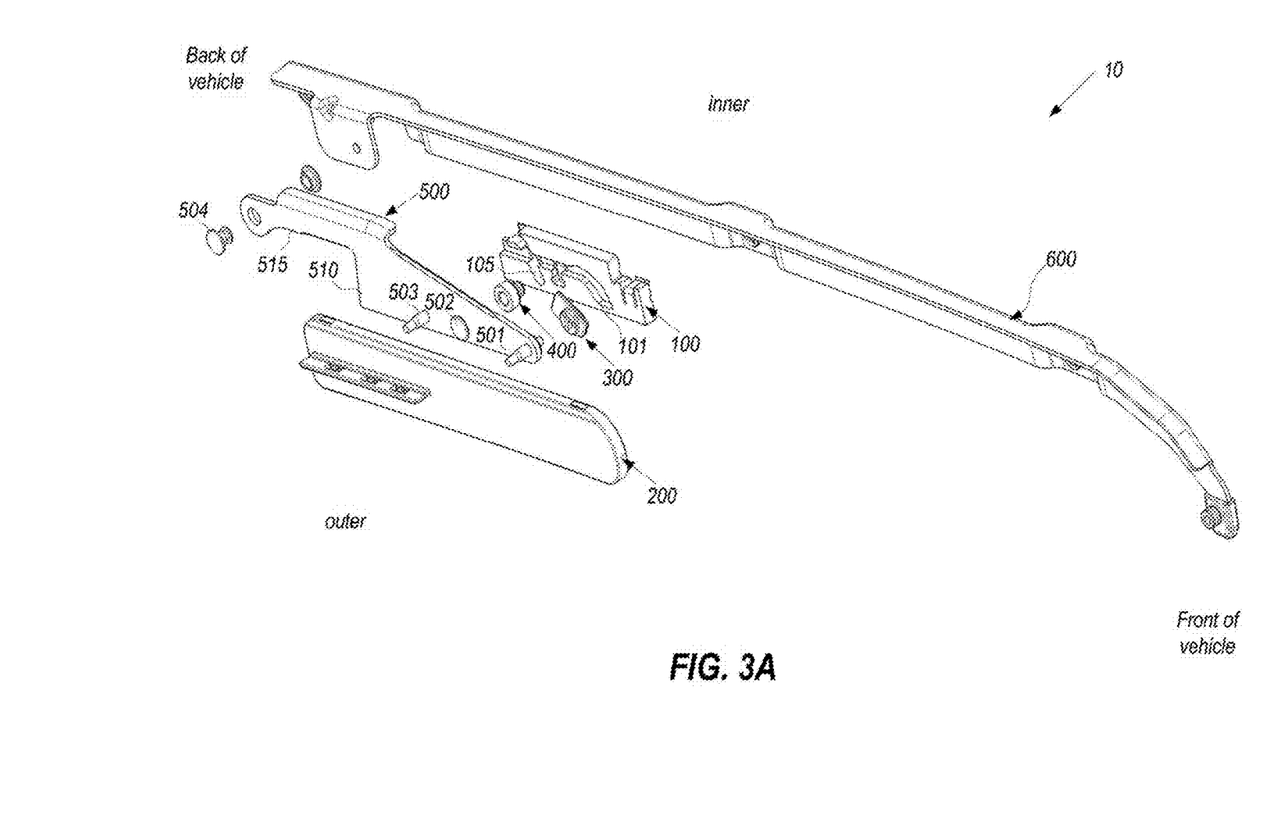
FIGS. 3A and 3B are an exploded view of a sliding mechanism according to an exemplary embodiment of the present disclosure.
Figure 3B:
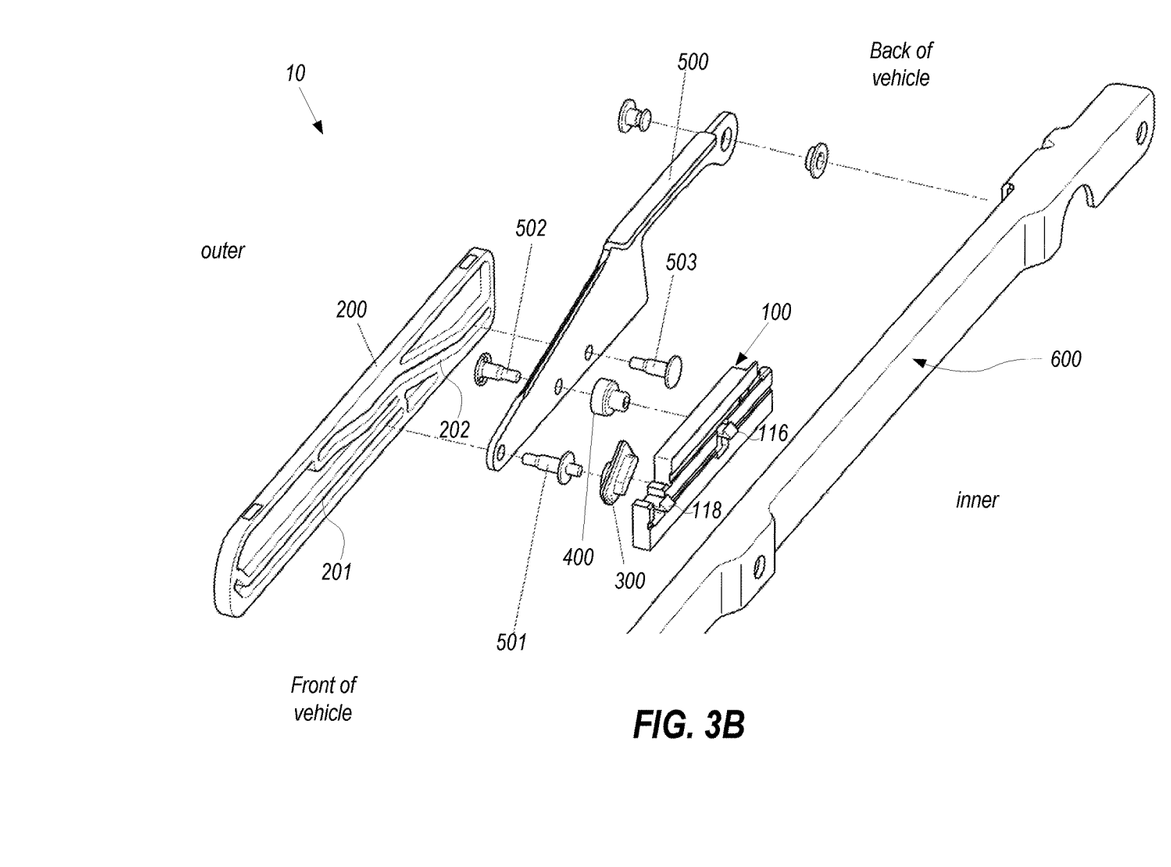

FIGS. 3A and 3B are an exploded view of a sliding mechanism 10 according to an exemplary embodiment of the present disclosure. The sliding mechanism 10 includes the guide block 100, the shoe 200, the check block 300, the roller 400, the link 500 and a bracket 600. The sliding mechanism can be assembled and connected via the bracket 600 to the panel A (in FIG. 1). One sliding mechanism 10 can be attached to the left side of the panel A and another to the right side of the panel A.

FIG. 3A shows the shoe 200 is located on the outer side relative to the guide block 100 and the link 500. The shoe 200 includes a first channel 201 and a second channel 202 (in FIG. 3B). The shoe 200 is a movable component that can slide along the rail 20 (in FIG. 1) from a front of the vehicle to the back of the vehicle. The shoe 200 can be connected to a motor (not shown) that can move the shoe 200 along the rail 20. The shoe 200 can drive, via the link 500 and the bracket 600, the panel A in the first position P1, the second position P2, and the third position P3.

The link 500 has a triangular portion 510 and a handle portion 515 together forming a knife-like structure. The link 500 includes a first pin 501 (also referred as a front pin 501), a second pin 502 (also referred as a rear pin 502) and a third pin 503 projecting from the triangular portion 510 of the link 501. The link 500 is connected to the shoe 200 on the outer side and the guide block 100 on the inner side. Further, the link 500 can be connected to the bracket 600 via a rivet 504. As such, the bracket 600 can follow the movements of the link 500 causing the bracket 600 and the first panel A to move between the positions P1. P2 and P3.

The first pin 501 is connected to a front channel 101 of the guide block and the second pin 502 is connected to a rear channel 105 of the guide block on the inner side. The first pin 501 is also connected to the first channel 201 of the shoe 200 and the third pin 503 is connected to the second channel 202 of the shoe 200 on the outer side.

The guide block 100 is located on the inner side relative to the shoe 200 and the link 500. The guide block 100 includes channels (further discussed in FIGS. 4A and 5) that define the motion of the front pin 501 and the rear pin 502 causing the link 500 to move the first panel A in the first position P1, the second position P2, and the third position P3. The working of the sliding mechanism 10, particularly a sub-assembly of the guide block 100, the shoe 200, and the link 500, is discussed in detail with respect to FIGS. 9A, 9B, and 9C.

Figure 3C:
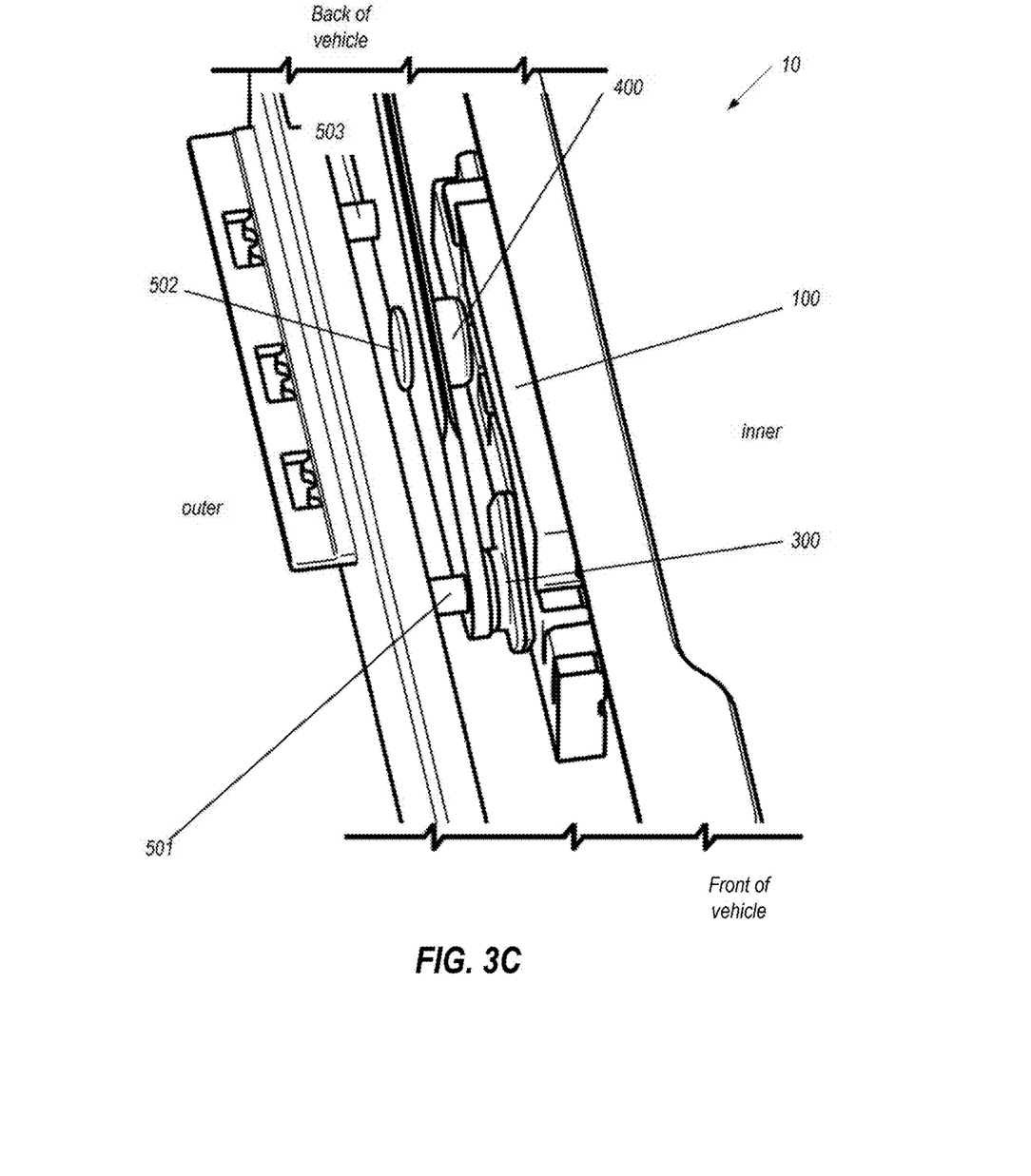
FIG. 3C illustrates an sub-assembly of a sliding mechanism according to an exemplary embodiment of the present disclosure.

FIG. 3C illustrates an assembly of the sliding mechanism 10 according to an exemplary embodiment of the present disclosure. The shoe 200 is connected to the link 500 via the first pin 501 and the third pin 503. The first pin 501 is slidably connected in the first channel 201 of the shoe 200, while the third pin 503 is slidably connected in the second channel 202 of the shoe 200. Thus, the relative motion between the link 500 and the shoe 200 is defined by the first channel 201 and the second channel 202.

The link 500 is also connected to the guide block 100 via the first pin 501 and the second pin 502. The front pin 501 is passed through the check block 300 to connect to the front channel 101 of the guide block 100. The second pin 502 is passed through the roller 400 to connect to the rear channel 105 of the guide block 100. Thus, the relative motion between the link 500 and the guide 100 is defined by the front channel 101 and the rear channel 105. The guide block 100 is further connected to the bracket 600 in a fixed manner via clips 116 and 118 of the guide block 100. The sub-assembly of the guide block 100 and the link 500 is also illustrated in FIG. 4B.

Figure 4A:
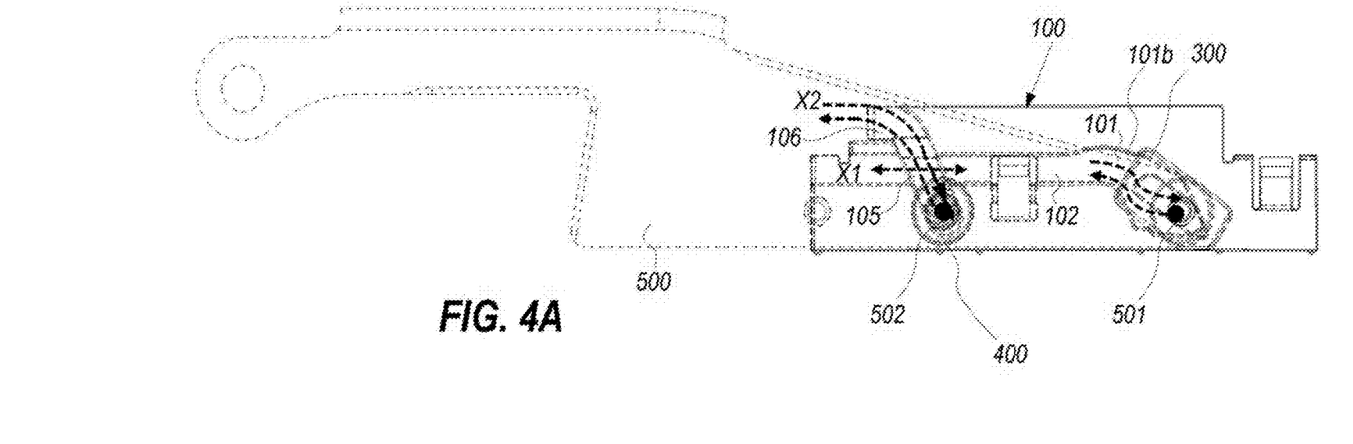
FIGS. 4A and 4B illustrates pin movements in the guide block according to an exemplary embodiment of the present disclosure.
Figure 4B:
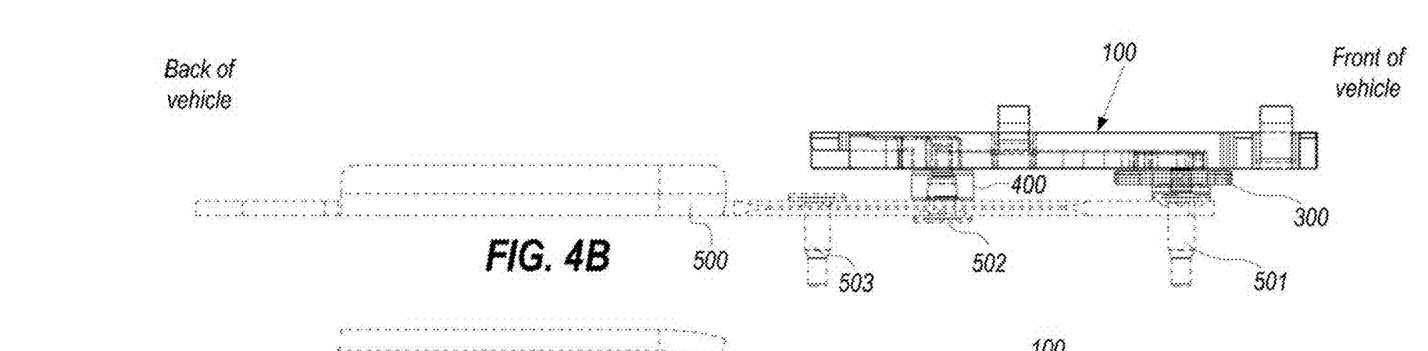

FIG. 4A illustrate paths of the font pin 501 and the rear pin 502 in the guide block according to an exemplary embodiment of the present disclosure. The front pin 501 is located in the front channel 101 connected via the check block 300, also shown in top view in FIG. 4B. The front pin 501 travels a first path X1 and the rear pin 502 travels a second path X2 in the guide block 100. The front pin 501 travels along the first path X1 and passes across the rear channel 105 at the cross-over region CX1 when moving from the front channel 101 towards the rear channel 105 along the first path X1. The cross-over region CX1 is a location along the first path X1. At the cross-over region CX1, a front pin 501 crosses the rear channel 105 without obstructing the rear pin 502, which moves simultaneously with the front pin 501 but along the path X2 in the rear channel 105. The second pin 502 passes the cross-over region CX1 before the first pin 501 reaches the cross-over region CX1, thus the second pin 502 does not obstruct the motion of the first pin 501.

Figure 5:
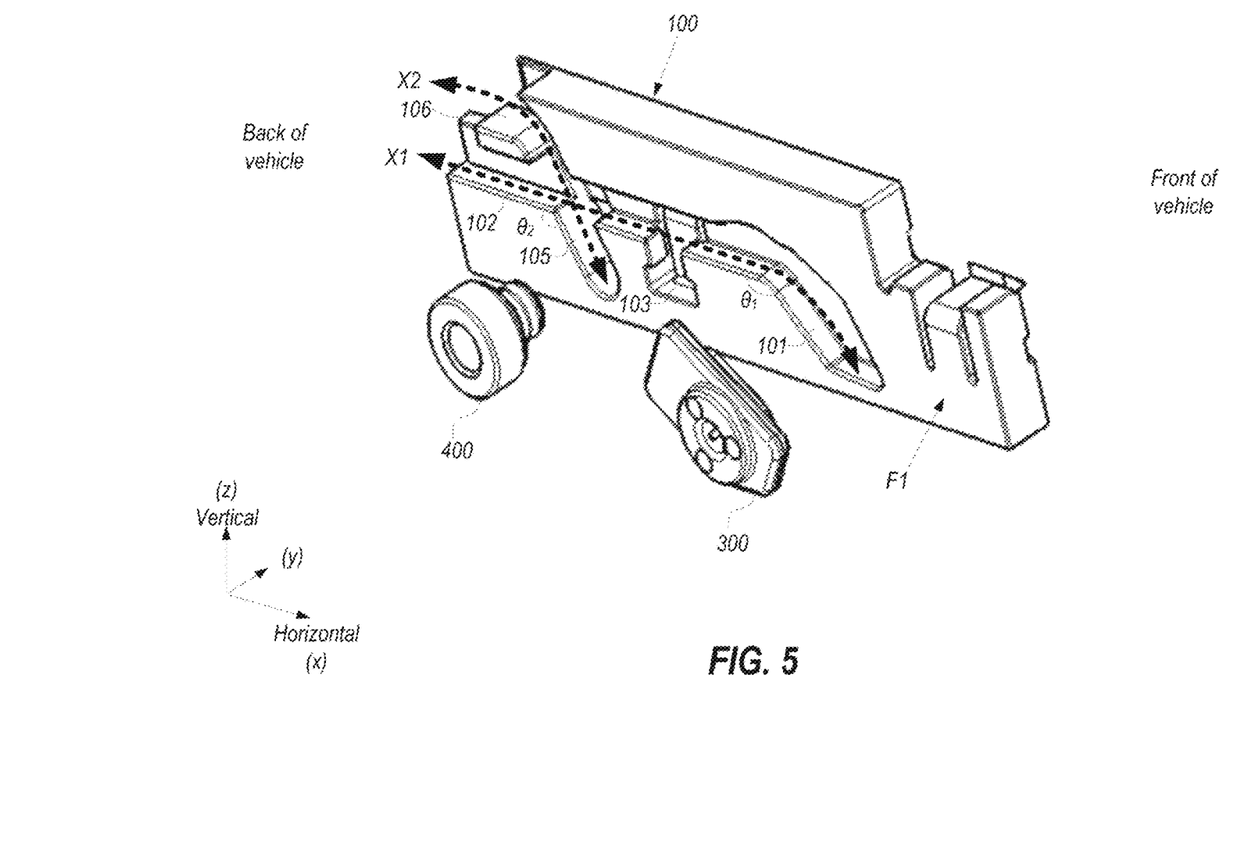
FIG. 5 is a perspective view of the guide block according to an exemplary embodiment of the present disclosure.

FIG. 5 is a perspective view of the guide block 100 according to an exemplary embodiment of the present disclosure. The guide block 100 is a substantially rectangular block with channels formed along the side. The guide block 100 includes the front channel 101, a lower channel 102, the rear channel 105, and an upper channel 106. Optionally, the guide block 100 can include a mid-channel 103. The channels 101, 102, 103, 105, and 106 are formed on the first surface F1 and have a depth along the y-axis (perpendicular to the first surface F1). The depth of the channels 101, 102, 103, 105, and 106 can vary.

The front channel 101 extends upward and connects to the lower channel 102 at a first angle $\theta_1$ with respect to the lower channel forming a first path X1. The rear channel 105 extends upwards and connects to the upper channel 106 at a second angle $\theta_2$ with respect to the lower channel 102 forming the second path X2. The first angle $\theta_1$ of the front channel 101 is greater than the second angle $\theta_2$ of the rear channel 105 making the rear channel 105 steeper than the front channel 101. Furthermore, the lower channel 102 and the upper channel 106 extend backwards in a horizontal direction and are substantially parallel to each other.

The mid-channel 103 can be formed between the front channel 101 and the rear channel 105. The mid-channel 103 can have an inverted-T shape. The mid-channel 103 can be formed for manufacturing attaching means such as the clip 116 (in FIG. 3B) that allows the guide block 100 to connect to the bracket 600. For example, during an injection molding of the guide block 100, the mid-channel 103 can be formed using dies for making the clip 116. The mid-channel 103 can also facilitate addition of attaching means that can be arranged parallel to the clip 116 located behind the front channel 101.

Furthermore, the guide block 100 can be connected to the check block 300 and the roller 400. The check block 300 can be slidably connected to the front channel 101 and the roller 400 can be slidably connected to the rear channel 105. The check block 300 can travel along the path X1 and the roller 400 can travel along the path X2.

The guide block 100 has a unitary construction. The guide block 100 can be made of different materials including metallic and non-metallic materials such as steel, cast iron, aluminum, or plastic. The channels 101, 102, 103, 105, and 106 can be formed using standard machining and manufacturing processes such as milling, shaping, cutting, forming, molding, etc.

Figure 6A:
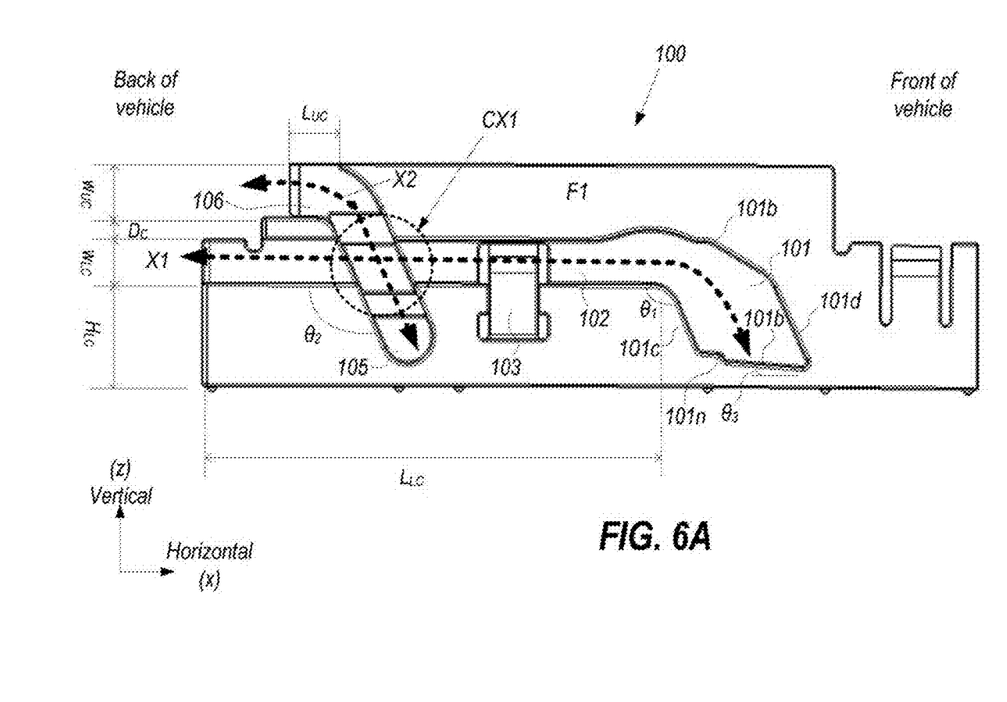
FIGS. 6A-6B illustrates different views of the guide block and a cross-over region according to an exemplary embodiment of the present disclosure.
Figure 6B:
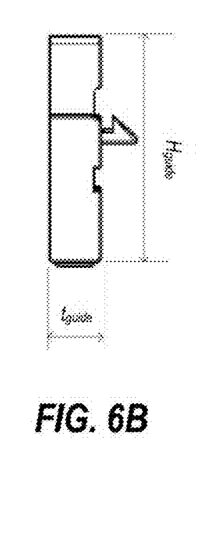

FIGS. 6A and 6B illustrate an elevation view and a side view, respectively, of the guide block according to an exemplary embodiment of the present disclosure. The front channel 101 has a base edge 101a that is seamlessly connected to a curved edge 101b by side edges 101c and 101d. The front channel 101 has a variable width that increases from the lower channel 102 to the base edge 101a in a non-linear manner. Furthermore, the base edge 101a can include a notch 101n to prevent a horizontal movement of an element (e.g., the check block 300) connected in the front channel 101. Optionally, the base edge 101a can be inclined at a third angle $\theta_3$, measured with respect to the horizontal or x-axis, to allow easier upward movement of the check block 300 (not shown in FIGS. 6A and 6B).

Figure 6C:
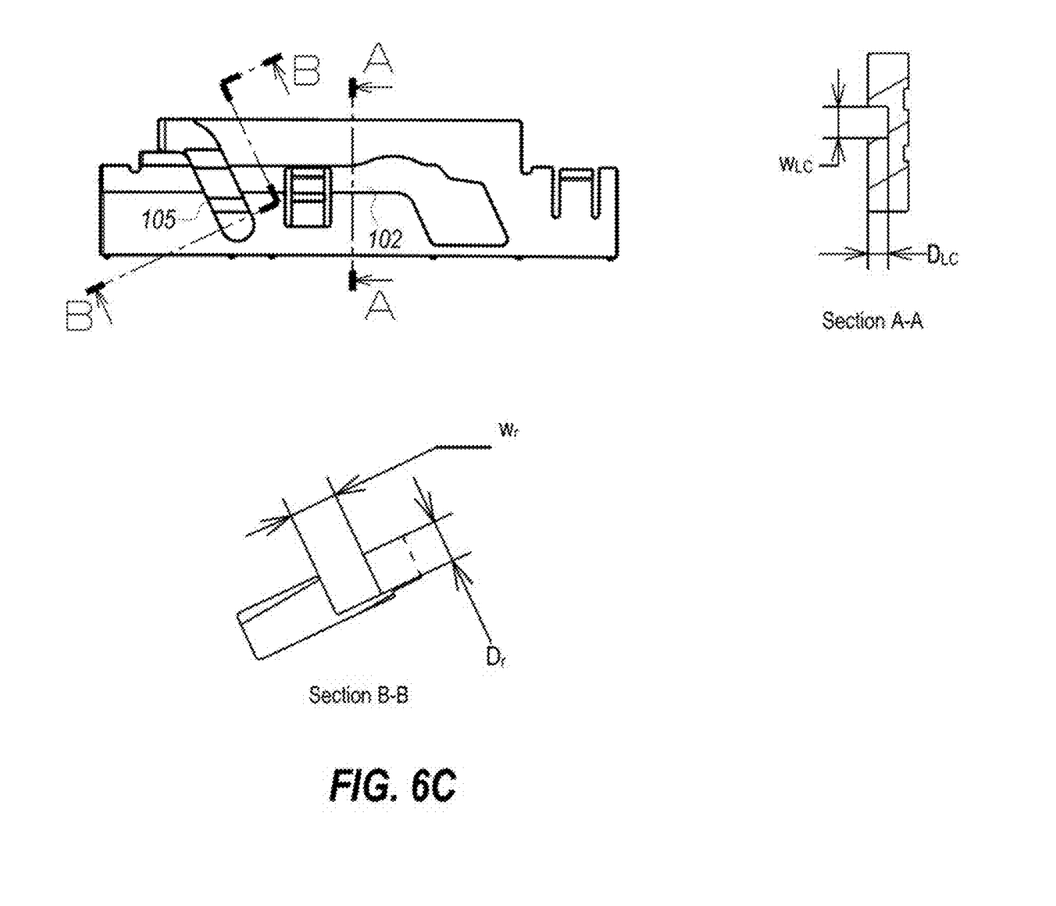
FIG. 6C shows cross-section views of a rear channel and a front channel of the guide block according to an exemplary embodiment of the present disclosure.

The rear channel 105 is substantially straight, has uniform width and a length, which is greater than a length of the front channel 101. Referring to FIG. 6C, the section B-B shows the rear channel 105 has a width $w_{RC}$ and a depth $D_{RC}$. The section A-A shows the lower channel channel 102 has a width $w_{LC}$ and a depth $D_{LC}$. The ratio widths ($w_{RC}/w_{LC}$) can be greater than 1, for example, the ratio ($w_{RC}/w_{LC}$) can be 1.75:1, indicating the width of the rear channel 105 is greater than the width of the lower channel 102. Similarly, the ratio of depths ($D_{RC}/D_{LC}$) can be greater than 1, for example, the ratio ($D_{RC}/D_{LC}$) can be 1.25:1, indicating the depth of the rear channel 105 is greater than the depth of the lower channel 102.

The rear channel 105 intersects the lower channel 102 at a cross-over region CX1. Conventionally, cross-over regions do not exist in the guide blocks and a front pin never cross the path of a rear pin. The cross-over region CX1 allows a relatively smaller length of the guide block 100, thus making the guide block 100 compact.

The lower channel 102 and the upper channel 106 extend in the horizontal direction towards the left. The lower channel 102 is longer than the upper channel 106 and located below the upper channel 106. The lower channel 102 has a length $L_{LC}$ and width $W_{LC}$. The lower channel 102 is located at a height $H_{LC}$ from the base of the guide block 100. The distance between the lower channel 102 and the upper channel 106 is $D_C$.

Figure 7A:
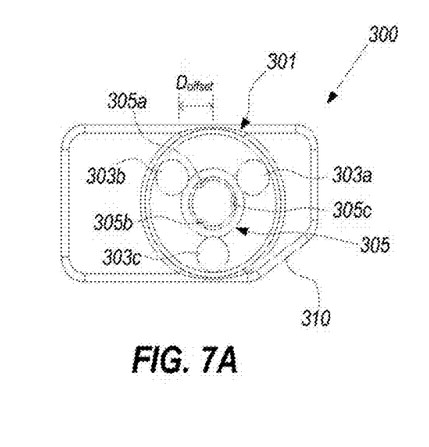
FIGS. 7A-7D illustrates a check block of the guide block according to an exemplary embodiment of the present disclosure.
Figure 7B:
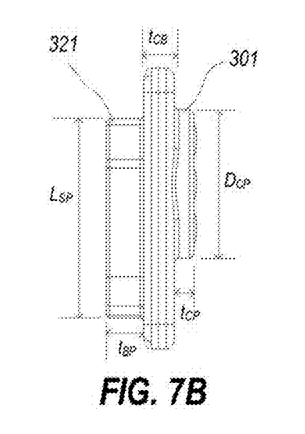
Figure 7C:
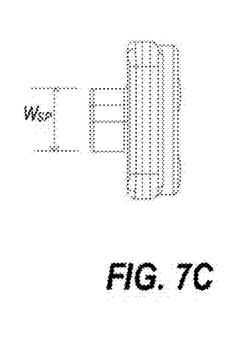
Figure 7D:
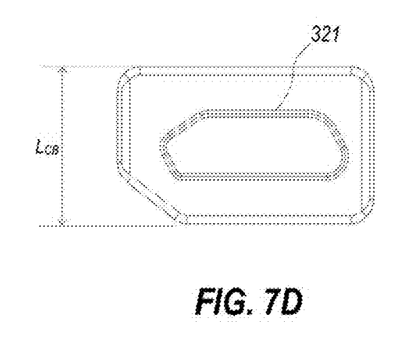

FIGS. 7A-7D illustrate different views of a check block of the check block 300 according to an exemplary embodiment of the present disclosure. FIGS. 7A and 7D, an elevation and back view respectively, show that the check block 300 has a significantly rectangular shape with a chamfered edge 310. The front side of the check block 300, in FIG. 7A, includes a font pin holder 301. The front pin holder 301 is a circular projection extending from the rectangular surface of the check block 300. The front pin holder 301 has a front pin hole 305. The front pin hole 305 can hold the front pin 501. The front pin hole 305 also include three indents 305a, 305b, and 305c on the inner side to provide a clearance between the front pin 501 and the check block 300. The indents 305a-305c also enables the front pin 501 to rotate relative to the check block 300. Furthermore, the front pin holder 301 is offset from the center of the check block 300 towards the chamfered edge 310 by a distance $D_{offset}$.

Furthermore, the check block 300 includes a sliding portion 321, illustrated in FIGS. 7D, 7B and 7C. The sliding portion 321 is a profiled projection extending from the back side of the check block 300. The sliding portion 321 rests in the front channel 101 of the guide block 100 (in FIG. 4A). The profiled shape of sliding portion 321 allows the check block 300 to stay locked in the front channel 101, when in the first position P1 or the second position P2. Further, the profiled shape is such that it allows the check block 300 to slide into the lower channel 102 of the guide block 100, when pulled upwards while moving into the third position P3. As such, the profiled shape and the offset of the front pin holder 305 allows the check block 300 to stay locked in the front channel 101 while the lever 500 rotates about the first pin 501 and to slide into the lower channel 102 when pulled upwards.

According to one embodiment, the length $L_{SP}$ of the sliding portion should be greater than the width of the mid-channel 103 of the guide block 100 to prevent the check block 300 from sliding down in the mid-channel 103 of the guide block 100.

The check block 300 also includes a plurality of bumps 303a, 303b, and 303c. The bumps 303a-303c provide a spacing between the front pin holder 301 and link 500 that connects to the front pin holder 301. Also, each of the bumps 303a-303c make a point contact with the link 500, thus reducing friction and facilitating smooth sliding motion of the check block 300.

Referring back to FIGS. 4A and 4B, the check block 300 enables the lever 500 to rotate about the front pin 501 and pull the front pin 501 into the front channel 101 to travel the first path X1. The sliding portion 321 of the check block 300 can slide in the front channel 101 in a non-linear manner, thus eliminating a non-linear movement of the first pin along the curved edge 101b and creating a smooth path (e.g., the first path X1) for the first pin. The check block 300 enables the front pin 501 to travel back and forth along the first path X1. The sliding portion 321 of the check block 300 compensate for non-linear portion of the front channel 101, thus allowing the first pin 501 to travel along irregular shape of the curved edge 101b in a smooth manner.

Referring back to FIGS. 7A-7D, the check block 300 can have a length $L_{CB}$, and thickness $t_{CB}$. The sliding portion 321 can have a length $L_{SP}$, a width $w_{SP}$, and thickness $t_{SP}$. The thickness $t_{SP}$ and length $L_{SP}$ of the sliding portion 321 is such that it can fit in the lower channel 102 of the guide block 100. As such, the a width $w_{SP}$ is approximately same or less than the width of the lower channel 102 (FIG. 6A). The circular portion 301 can have a diameter $D_{CP}$ and a thickness $t_{CP}$.

Figure 8A:
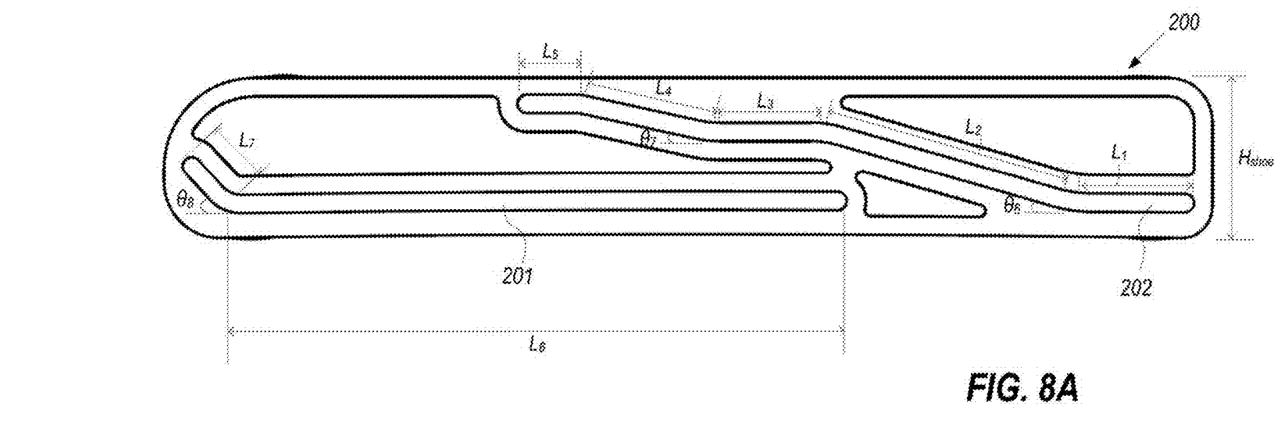
FIGS. 8A and 8B illustrates different views of the shoe according to an exemplary embodiment of the present disclosure.
Figure 8B:
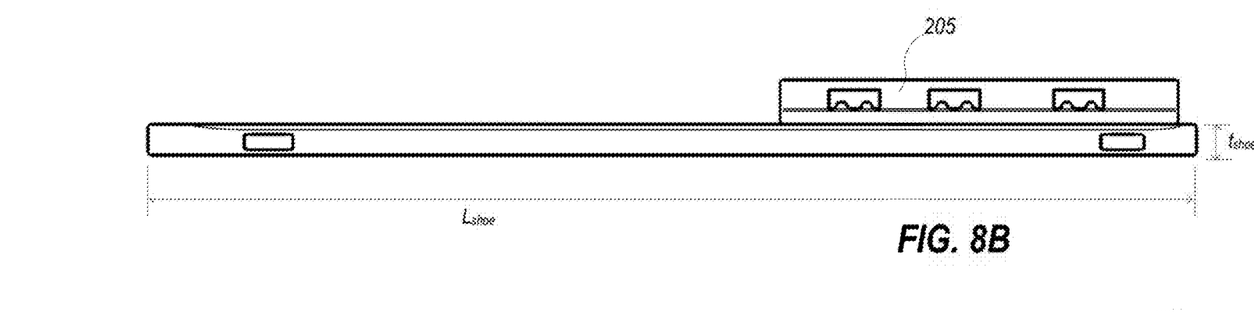

FIGS. 8A and 8B illustrate different views of the shoe 200 according to an exemplary embodiment of the present disclosure. The shoe 200 is a substantially rectangular block with the first channel 201 and the second channel 202 formed on the surface. The first channel 201 and the second channel 202 have a profiled shape that start at the same level on the right end of the shoe 200. The shoe 200 can have a length $L_{shoe}$ and a thickness $t_{shoe}$.

The first channel 201 has a horizontal portion of length $L_6$ and an inclined portion of length $L_7$ inclined at an angle $\theta_8$. The first channel 201 can extend upwards from the bottom to approximately middle of the shoe 200.

The second channel 202 has a step like structure with each step connected by a ramp. The second channel 202 has a first horizontal portion of length $L_1$, a second ramp portion of length $L_2$ included at an angle $\theta_6$, a third horizontal portion of length $L_3$, a fourth ramp portion of length $L_4$ included at an angle $\theta_7$ and a fifth horizontal portion of length $L_5$. The second channel 202 extends upwards from a bottom to the top of the shoe 200 in a continuous manner.

Figure 9A:
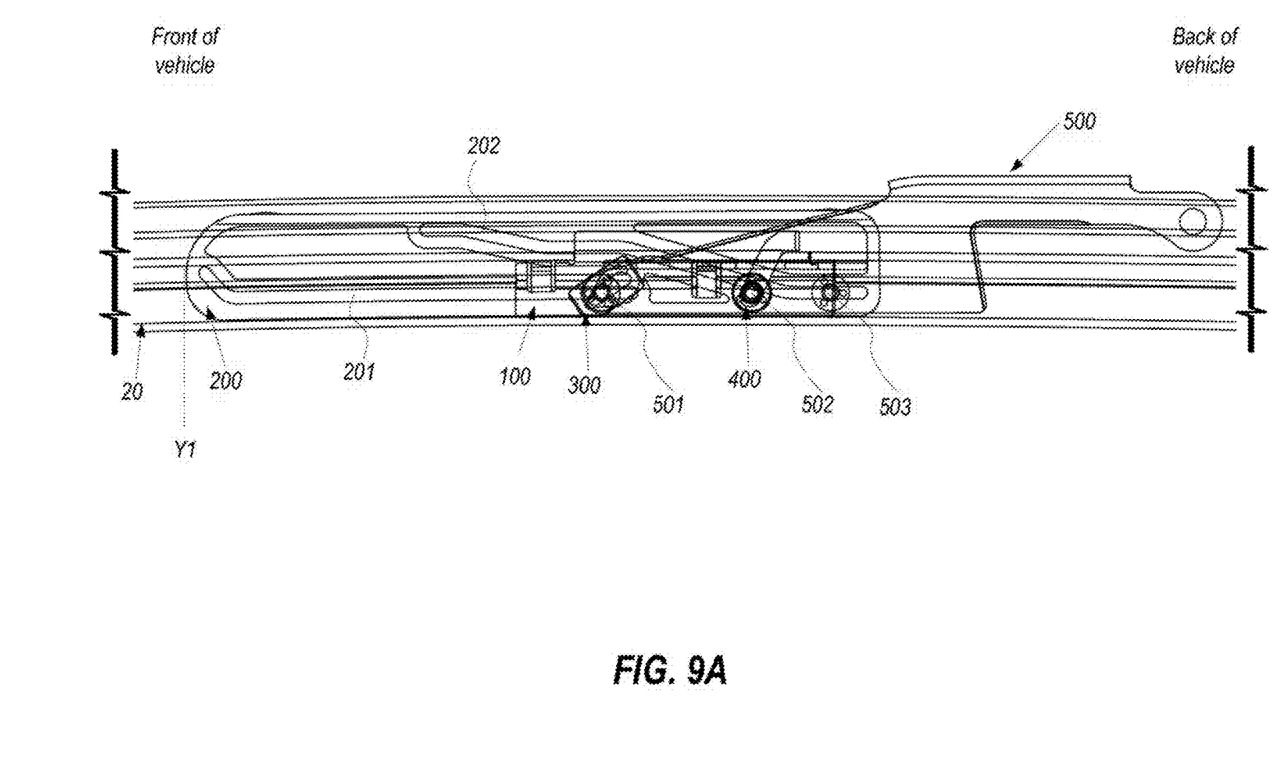
FIG. 9A illustrates the sliding sub-assembly in a first position (closed) according to an exemplary embodiment of the present disclosure.
Figure 9B:
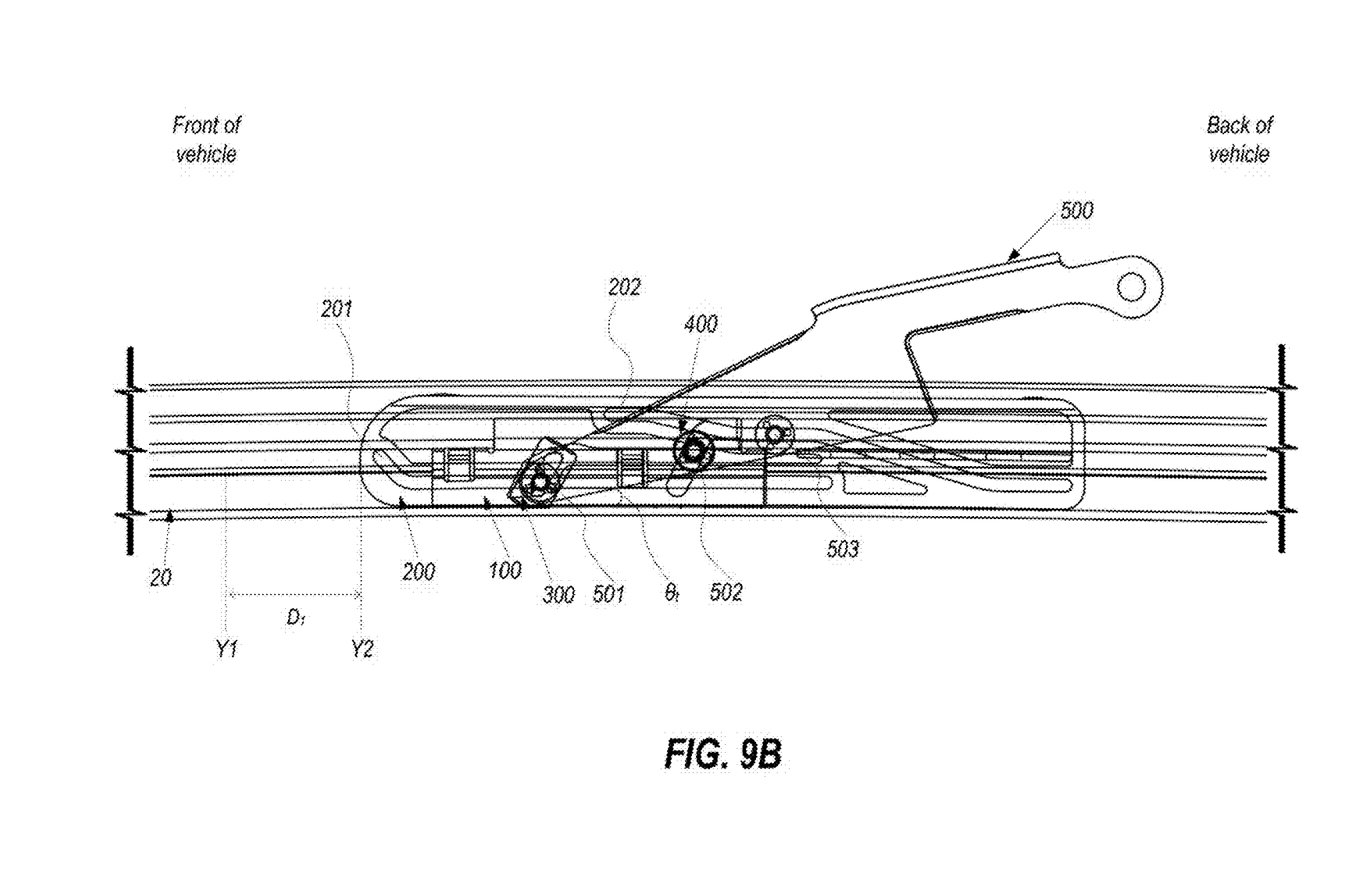
FIG. 9B illustrates the sliding sub-assembly in a second position (tilt-up) according to an exemplary embodiment of the present disclosure.
Figure 9C:
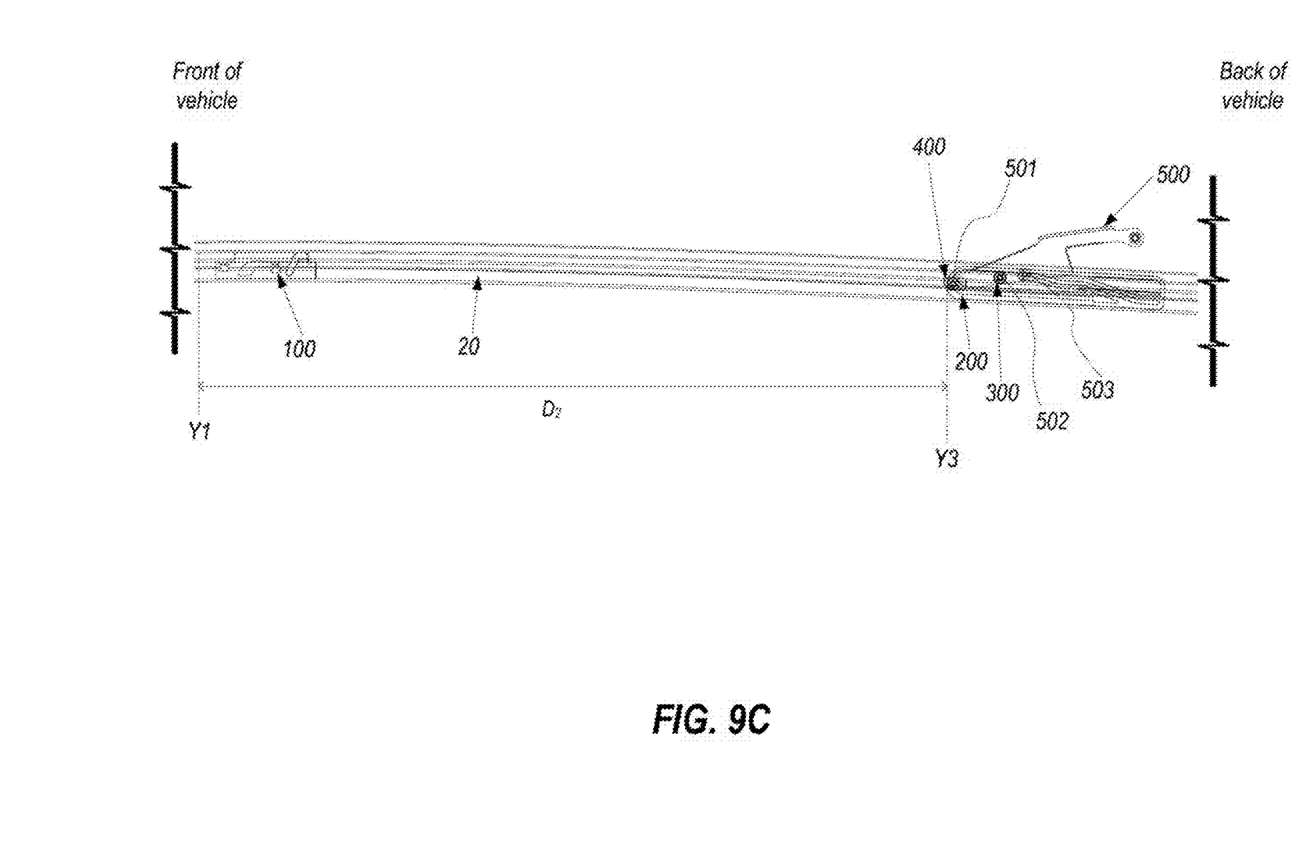
FIG. 9C illustrates the sliding sub-assembly in a third position (open) according to an exemplary embodiment of the present disclosure.

The first pin 501 of the link 500 travels along the first channel 201, while the third pin 503 travels along the second channel 202 during the operation of the sliding mechanism 10, as shown in FIGS. 9A, 9B and 9C.

FIG. 9A illustrates a sub-assembly of the sliding mechanism in the first position P1 according to an exemplary embodiment of the present disclosure. In the first position P1, the shoe 200, the guide block 100 and the lever 500 are horizontally aligned. The guide block 100 and the lever are located near the right side of the shoe 200. The first pin 501 of the lever 500 rests in the front channel 101 (not illustrated here) of the guide block 100 and also in the first channel 201 of the shoe 200. The second pin 502 rests in the rear channel 105 (not illustrated here) of the guide block 100 and the third pin 503 rests in the second channel 202 of the shoe 200, as discussed earlier. The pins 501, 502, and 503 are approximately at the same level. The left end of the shoe 200 is at a first reference point Y1 near the front of the vehicle along the rail 20.

When the shoe 200 moves backwards, the sliding mechanism occupies the tilt-up position or the second position P2, as shown in FIG. 9B.

In FIG. 9B, the shoe 200 moves backwards, to a second reference point Y2, relative to the guide block 100 and the lever 500. For example, the shoe 200 moves by a distance D1 (e.g., 64 mm), measured from the first reference point Y1 to the second reference point Y2, towards the back of the vehicle. As the shoe 200 moves, the check block 300 remains locked due to the notch 101n (not illustrated) and the lever 500 rotates about the first pin 501 by an angle $\theta_r$. As the lever 500 rotates, the second pin 502 travels along the path X2 (shown in FIG. 4A) and rests approximately at the cross-over region CX1 in the rear channel 105. Simultaneously with the second pin 502, the third pin 503 travels along the first channel 201 of the shoe 200 in upward direction and rests approximately at the middle of the second horizontal portion of the first channel 201. The first pin 501 remains in the front channel 101 of the guide block 100 and does not move. Thus, the sliding mechanism 10 (not illustrated) occupies the tilt-up position (i.e., the second position P2).

FIG. 9C illustrates the sliding sub-assembly in the third position P3 according to an exemplary embodiment of the present disclosure. To occupy the third position P3, the shoe 200 moves backwards along with the lever 500 to a third reference point Y3 by a distance D2 from the first reference Y1. As the shoe 200 moves, the notch 101n (refer FIG. 6A) facilitates the orientation and an upwards movement of check block 300 along the first channel 101. In the absence of the notch 101n, the check block 300 will be blocked by the side edge 101c (refer FIG. 6A) and the check block 300 will be unable to orient upwards and move to the lower channel 102. Relatively, the shoe 200 and the lever 500 are located towards the back of the vehicle and the guide block 100 is at the front of the vehicle. Also, the lever 500 remains in the tilted position. Thus, the guide block 100 is separated from the lever 500 and the shoe 200. The shoe 200 travels a distance D2 from the closed position towards the back of the vehicle to occupy the open position.

When transitioning from the second position P2 to the third position P3, the roller 400 and the check block 300 are separated from the guide block 100, but stay connected to the shoe 200 and the lever 500.

The roller 400, which is connected to the lever 500 via the second pin 502, travels along the upper channel 106 of the guide block 100, separates from the guide block 100 and continues to travel towards the back of the vehicle along the rail 20. Similarly, the check block 300, which is connected to the lever 500 and the shoe 200 via the first pin 501, travels along the lower channel 102 of the guide block, separates from the guide block 100 and continues to travel towards the back of the vehicle along the rail 20.

Since the lever 500 is connected to the sliding panel A via the bracket 600 (in FIG. 3), the sliding panel A moves towards the back of the vehicle, thus occupying the open position.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A sliding apparatus for a sunroof of an automobile, comprising:
   a shoe having a first channel and a second channel slidably connected to a rail;
   a guide block including a front channel connecting a lower channel to form a first path, and a rear channel connecting to an upper channel to form a second path;
   a lever including a first pin projecting from a first side and a second side, a second pin projecting from the first side, and a third pin projecting from the second side,
   wherein the first pin is connected to the front channel of the guide block and the second pin is connected to the rear channel of the guide block on the first side, and the first pin is connected to the first channel of the shoe and the third pin is connected to the second channel of the shoe on the second side,
   wherein the first pin travels along the first path in the guide block, and the second pin travels along the second path in the guide block.

2. The sliding apparatus according to claim 1, wherein the front channel is in a surface of the guide block and extends upwards and connects to a lower channel at a first angle with respect to the lower channel, and the rear channel is in the surface of the guide block and extends upwards and connects to the upper channel at a second angle with respect to the upper channel,
   wherein the first path and the second path intersect at a cross-over region.

3. The sliding apparatus according to claim 1, wherein the front channel has a variable width that increases from the lower channel to a base edge in a non-linear manner.

4. The guide block according to claim 1, wherein the rear channel is substantially straight, has an uniform width, and is longer in length than the front channel.

5. The guide block according to claim 1, wherein the lower channel and the upper channel are substantially parallel and extend a horizontal direction of the guide block.

6. The guide block according to claim 5, wherein the lower channel is longer in length than the upper channel and located below the upper channel in a vertical direction of the guide block.

7. The sliding apparatus according to claim 2, further comprising:
   a check block including a sliding portion on one side and a front pin holder on the other side of the check block, wherein the sliding portion is slidably connected to the front channel of the guide block and the front pin holder is pivotably connected to the lever via the first pin passing into the front pin holder; and
   a roller slidably connected to the rear channel of the guide block and pivotably connected to the lever via the second pin.

8. The sliding apparatus according to claim 7, wherein the first channel includes a notch that orients and guides the check block to move upwards along the front channel.

9. The sliding apparatus according to claim 8, wherein the lever transitions between a first position, a second position and a third position as the shoe moves along the rail towards a back of the automobile.

10. The sliding apparatus according to claim 9, wherein in the first position, the lever is horizontal and the first pin, the second pin and the third pin are aligned.

11. The sliding apparatus according to claim 9, wherein in the second position, the first pin of the lever stays in the front channel of the guide block, and the second pin of the lever travels upwards in the rear channel causing the lever to pivot about the first pin and tilt upwards.

12. The sliding apparatus according to claim 9, wherein in the third position, the lever is in a tilted state and separates from the guide block as the shoe moves along the rail.

13. The sliding apparatus according to claim 12, wherein the first pin located in the front channel passes across the rear channel at the cross-over region when the first pin moves from the front channel towards the rear channel along the first path.

14. The sliding apparatus according to claim 13, wherein the first pin crosses the rear channel after the second pin located in the rear channel travels upwards along the second path into the upper channel, wherein the first pin and the second pin are moving simultaneously.

15. The sliding apparatus according to claim 8, further comprising a mid-channel located between the rear channel and the front channel.

16. The sliding apparatus according to claim 15, wherein a width of the mid-channel is less than the length of the sliding portion.

* * * * *